United States Patent [19]

Suzuki

[11] Patent Number: 5,058,094
[45] Date of Patent: Oct. 15, 1991

[54] DISC LOADING APPARATUS

[75] Inventor: Masayuki Suzuki, Tokyo, Japan

[73] Assignee: Sony Corporation, Tokyo, Japan

[21] Appl. No.: 536,314

[22] Filed: Jun. 7, 1990

[30] Foreign Application Priority Data

Jul. 7, 1989 [JP] Japan ................................. 1-176155

[51] Int. Cl.$^5$ ..................... G11B 33/02; G11B 5/016; G11B 17/04
[52] U.S. Cl. ................................. 369/77.1; 369/75.1; 369/75.2; 369/77.2; 360/99.02; 360/99.06
[58] Field of Search ..................... 369/75.1, 75.2, 77.1, 369/77.2, 270, 271; 360/99.02, 99.06, 114

[56] References Cited

U.S. PATENT DOCUMENTS

| | | | |
|---|---|---|---|
| 4,477,894 | 10/1984 | Clurman | 369/270 |
| 4,669,076 | 5/1987 | Broom et al. | 369/77.1 |
| 4,731,775 | 3/1988 | Katsuyama | 369/75.2 |
| 4,740,939 | 4/1988 | Watanabe | 369/270 X |
| 4,745,502 | 5/1988 | Takatori | 360/99 |
| 4,796,251 | 1/1989 | Hirano | 369/75.2 |
| 4,797,770 | 1/1989 | Takahashi | 369/291 |
| 4,799,209 | 1/1989 | Grobben | 369/75.2 |
| 4,802,158 | 1/1989 | Ogusu | 369/270 |
| 4,847,826 | 7/1989 | Sakaguchi et al. | 369/270 |
| 4,896,312 | 1/1990 | Odawara | 369/77.2 |

OTHER PUBLICATIONS

Patent Abstracts of Japan No. 63-234443 (Iwata).

Primary Examiner—David Trafton
Assistant Examiner—Tien Ba Pham
Attorney, Agent, or Firm—Lewis H. Eslinger; Jay H. Maioli

[57] ABSTRACT

A magneto-optical disc recording and/or reproducing apparatus records and/or reproduces a magneto-optical disc rotatably incorporated within a disc cartridge and in which a disc hub formed of a magnetizable metal plate is attached to a central portion of the disc. This magneto-optical disc recording and/or reproducing apparatus is comprised of a rotating device for clamping the disc hub by a magnetic attracting force of a magnet to thereby rotate the disc, a loading device having a cartridge holder for holding a disc cartridge inserted and for loading on the rotating device the magneto-optical disc inserted into the disc cartridge by the up and/or down movement of the cartridge holder, a supporting device for supporting a bias magnetic field generating device so that the bias magnetic field generating device can be freely moved up and down in the direction remote from and/or close to the magneto-optical disc which is clamped by the rotating device as the cartridge holder is moved up and/or down, and a pushing device for pushing a central portion of the magneto-optical disc so that, when the magneto-optical disc is loaded on the disc rotating device by the loading device, a center aperture of the disc hub is engaged with a spindle shaft of the disc rotating device.

10 Claims, 4 Drawing Sheets

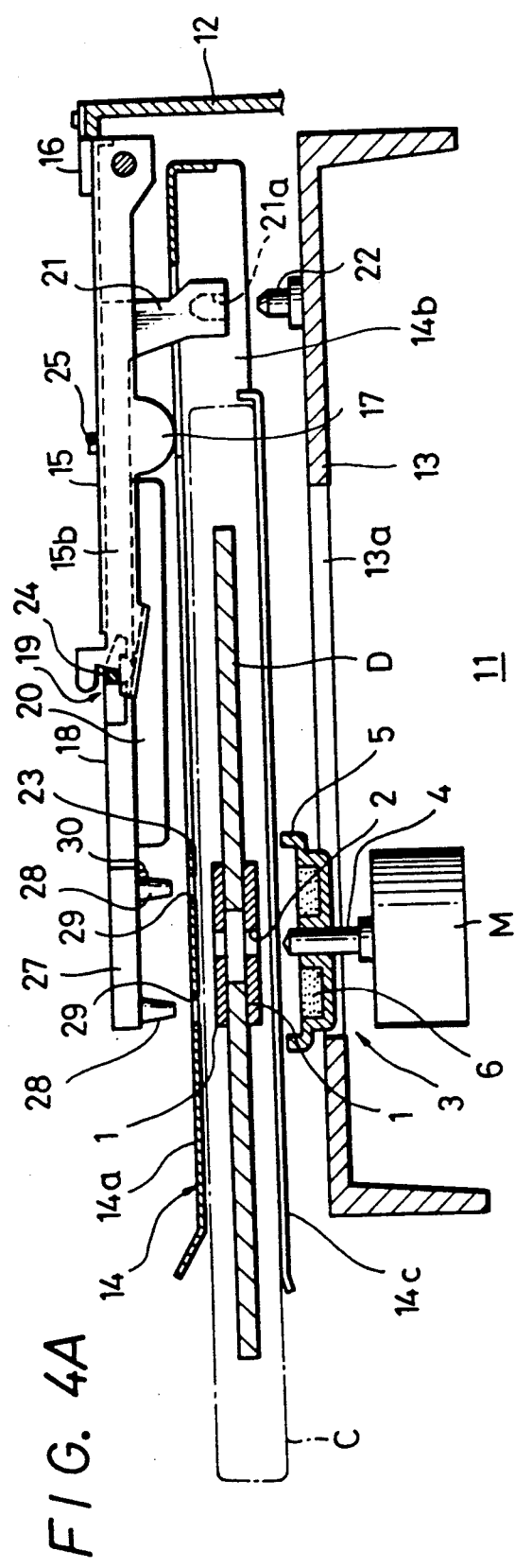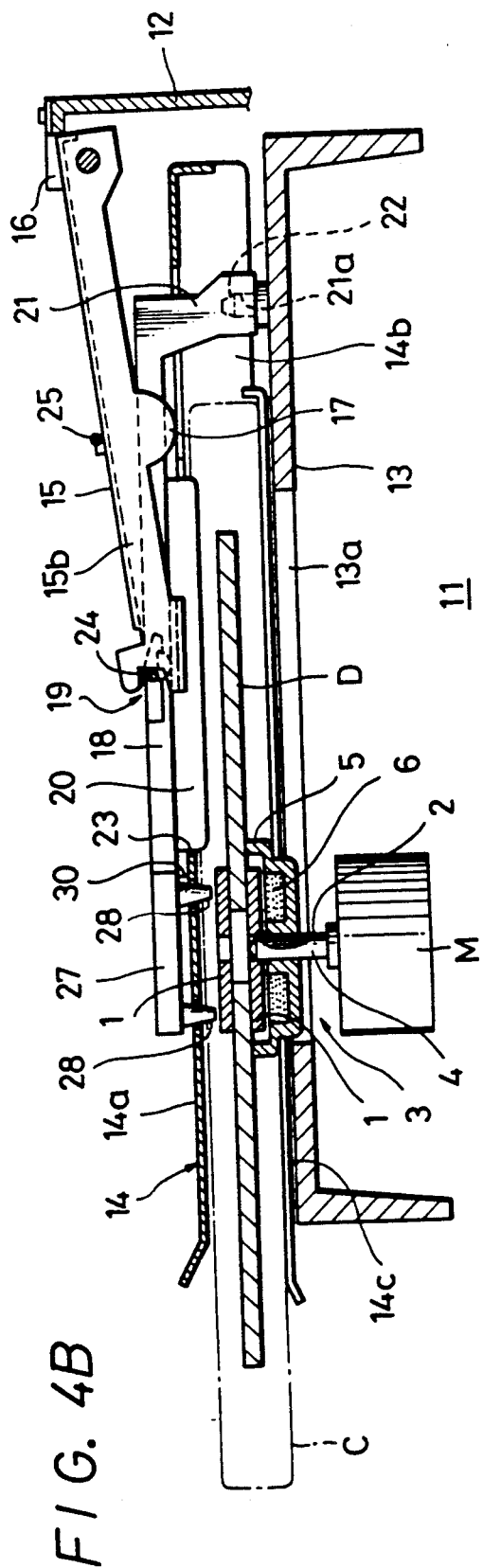

DISC LOADING APPARATUS

BACKGROUND OF THE INVENTION

1. Field of the Invention

The present invention relates generally to disc loading apparatus and, more particularly, is directed to a mechanism of a disc loading apparatus which ensures that a disc such as an optical disc is clamped on a disc turntable positively.

2. Description of the Prior Art

A magnetic clamping system is known as one of the disc clamping systems utilized in the existing optical disc recording and/or reproducing apparatus (see Japanese Patent Laid-Open Gazette No. 63-234443). An example of a prior-art magnetic clamping system will be described with reference to FIGS. 1A and 1B.

Referring to FIGS. 1A and 1B, there is shown a disc D such as an optical disc in which a disc hub 1 is attached to both surfaces of the disc D at its central portion. The disc hubs 1 are each made of a magnetizable metal plate and secured to both surfaces of the disc D by some suitable bonding material such as a double-sided bonding tape and the like. A disc center aperture 2 is formed through the central portion of each of the disc hubs 1. DA designates the aperture of the disc D.

A clamping device 3 is provided to clamp the disc D. This clamping device 3 is comprised of a saucer-shaped turntable 5 attached to a spindle shaft 4 of a drive motor (not shown) and a magnet 6 secured to the bottom portion of the turntable 5. The top portion of the spindle shaft 4 is projected above from the central portion of the turntable 5. The upper end face of the top portion of the spindle shaft 4 is tapered so that it can be engaged with the center aperture 2 of the disc hubs 1 with ease.

When the disc D is translated in the lower direction during the loading operation from the condition that the disc hub 1 of the disc D is opposed to the turntable 5 of the clamping device 3 (see FIG. 1A), the disc hub 1 is magnetically attracted by the magnet 6 of the turntable 5 and the center aperture 2 is engaged with the top portion of the spindle shaft 4, whereby the disc D is clamped on the turntable 5 under the condition that the disc D is held on the turntable 5 (see FIG. 1B).

In the aforementioned magnetic clamping system, when the disc D is loaded on the clamping device 3, even if the center aperture 2 of the disc D and the spindle shaft 4 are not opposed to each other accurately, i.e., they are displaced from each other by a small amount, the center aperture 2 is guided along the tapered surface of the top portion of the spindle shaft 4 by the magnetic attracting force of the magnet 6, resulting in the disc D being positively clamped on the turntable 5.

However, in the event that the center aperture 2 of the disc hubs 1 or the spindle shaft 4 is damaged because of the frequent use, the friction during the clamping is increased so that the center aperture 2 can not be fully attracted to the top portion of the spindle shaft 4 by only the magnetic attracting force of the magnet 6. Consequently, as shown in FIG. 2, a so-called mis-clamping occurs, in which the disc D is skewed and then clamped on the turntable 5 under such an imperfect engagement condition that the edge portion of the center aperture 2 is brought in contact with the tapered surface of the top portion of the spindle shaft 4. In the event that the turntable 5 rotates under such mis-clamping condition, the center aperture 2 of the disc hubs 1 and the spindle shaft 4 will be damaged considerably.

Further, a mis-clamping occurs easily, so that the disc D and the spindle shaft 4 can not be used any more.

OBJECTS AND SUMMARY OF THE INVENTION

Accordingly, it is an object of the present invention to provide an improved disc loading apparatus which can eliminate the aforementioned shortcomings and disadvantages encountered with the prior art.

More specifically, it is an object of the present invention to provide a disc loading apparatus in which a center aperture of a disc is positively engaged with a spindle shaft so that the occurrence of a so-called mis-clamping can be prevented.

It is another object of the present invention to provide a disc loading apparatus in which a center aperture of a disc or a spindle shaft can be prevented from being damaged.

It is a further object of the present invention to provide a disc loading apparatus in which a disc can be prevented from becoming useless.

It is yet a further object of the present invention to provide a disc loading apparatus by which the life span of a disc recording and/or reproducing apparatus can be prolonged.

According to a first aspect of the present invention, a disc loading mechanism is comprised of a disc rotating device having clamping device for clamping a disc hub by a magnetic attracting force, the disc hub formed of a magnetizable metal plate and attached to a central portion of a disc to be loaded, a loading device for loading the disc on the disc rotating device, and a pushing device for pushing a central portion of the disc so that, when the disc is loaded on the disc rotating device by the loading device, a center aperture of the disc hub is engaged with a spindle shaft of the disc rotating device.

According to a second aspect of the present invention, a magneto-optical disc recording and/or reproducing apparatus records and/or reproduces a magneto-optical disc rotatably incorporated within a disc cartridge and in which a disc hub formed of a magnetizable metal plate is attached to a central portion, the magneto-optical disc recording and/or reproducing apparatus is comprised of a rotating device for clamping the disc hub by a magnetic attracting force so that the disc is rotated, a loading device for loading on the rotating device a disc cartridge into which the disc is inserted, a supporting device for supporting a bias magnetic field generating device so that the bias magnetic field generating device can be freely moved up and down in the direction remote from and/or close to a magneto-optical disc which is clamped by the rotating device in accordance with the loading operation of the disc by the loading device, and a pushing device for pushing a central portion of the magneto-optical disc so that, when the magneto-optical disc is loaded on the disc rotating device by the loading device, a center aperture of the disc hub is engaged with a spindle shaft of the disc rotating device.

These, and other objects, features and advantages of the present invention, will be apparent in the following detailed description of a preferred embodiment of the invention to be taken in conjunction with the accompanying drawings, in which like reference numerals are used to identify the same or similar parts in the several views.

BRIEF DESCRIPTION OF THE DRAWINGS

FIGS. 4A and 4B are side views of the disc loading apparatus shown in FIG. 1 respectively, wherein FIG. 4A shows the condition that a cartridge holder is at the upper limit position, and FIG. 4B shows the condition that the cartridge holder is at the lower position.

DETAILED DESCRIPTION OF THE PREFERRED EMBODIMENT

An embodiment of the disc loading apparatus according to the present invention will now be described with reference to FIGS. 3 to 5.

Figure 1A:
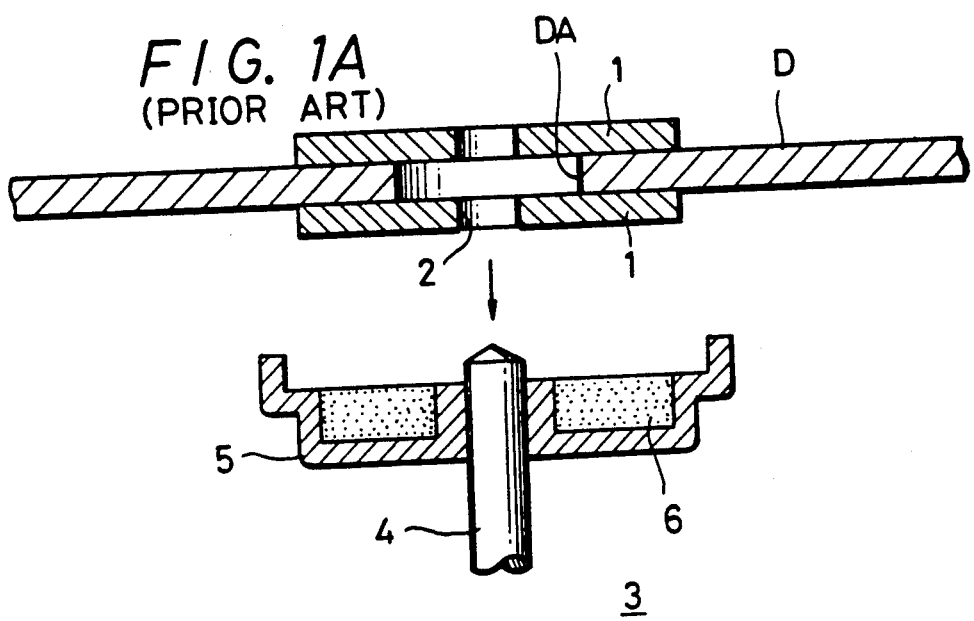
FIGS. 1A and 1B are side cross-sectional views used to explain a prior-art disc clamping operation of a magnetic clamping system, respectively.
Figure 1B:
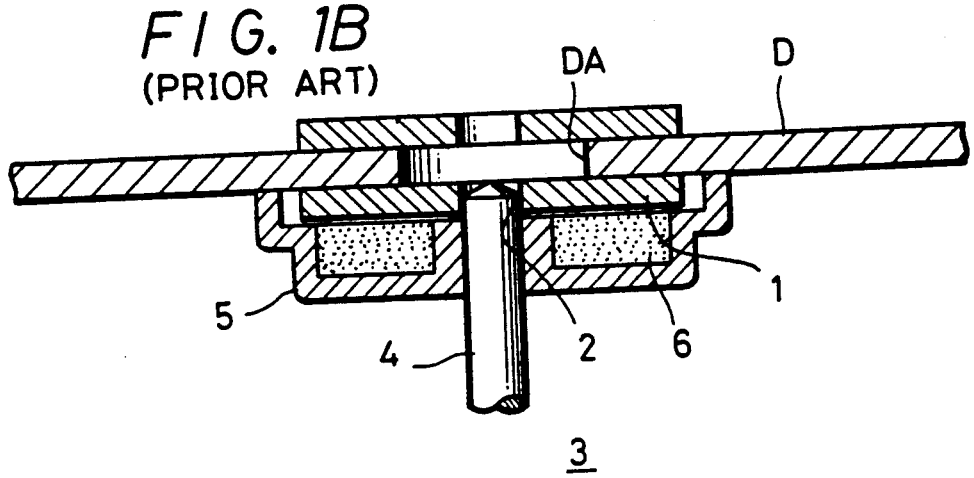
Figure 2:
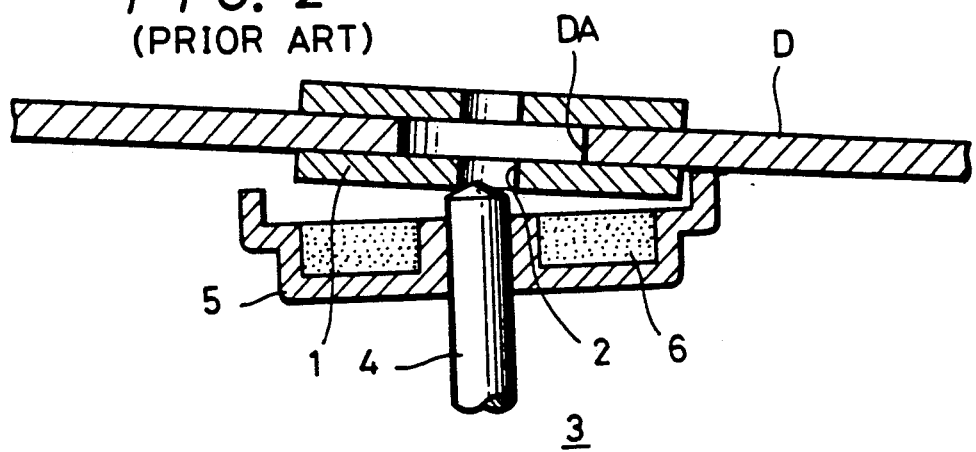
FIG. 2 is a side cross-sectional view used to explain a mis-clamping.
Figure 3:
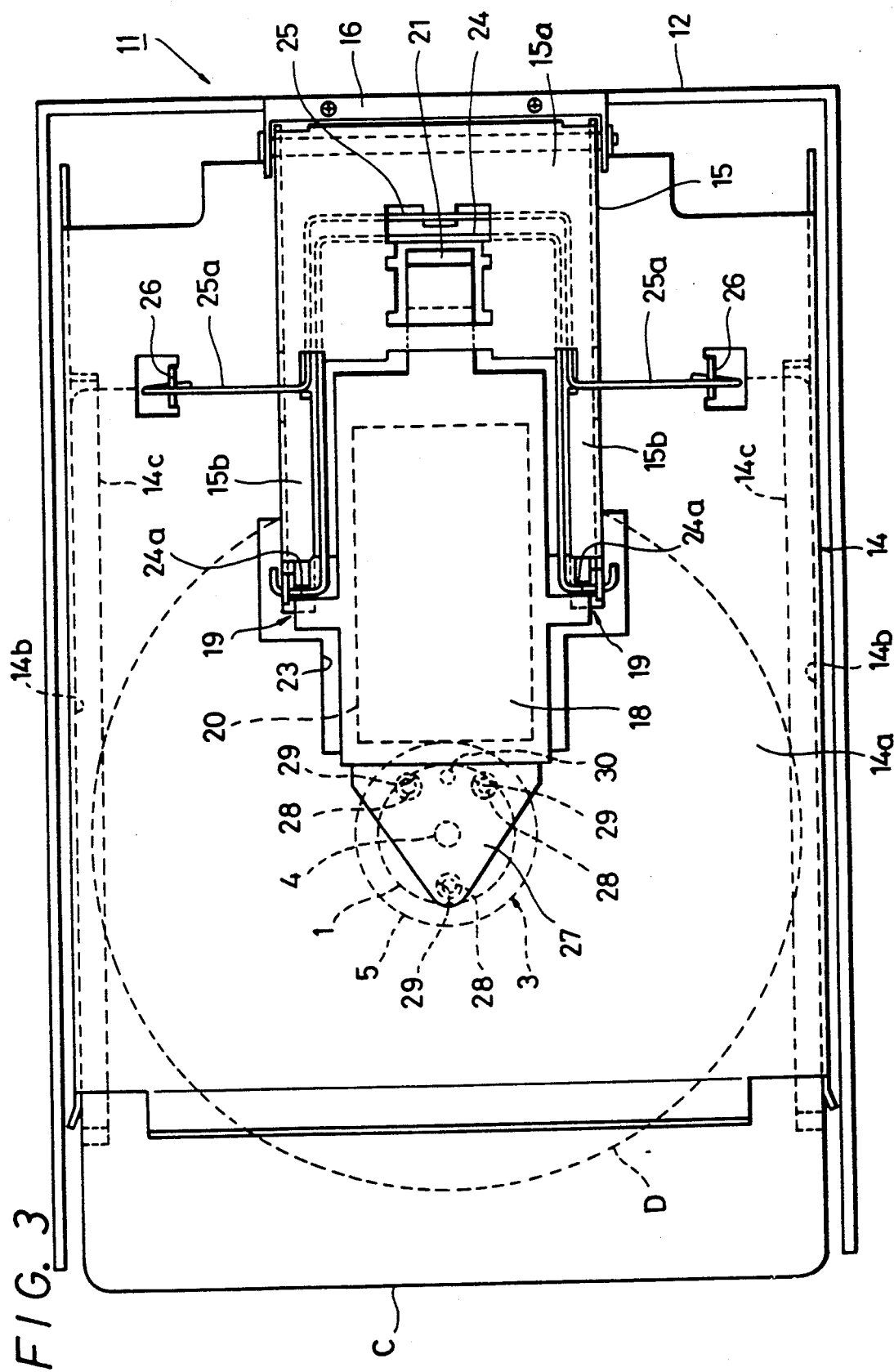
FIG. 3 is a plan view showing an embodiment of a disc loading apparatus according to the present invention.

In this embodiment, the disc loading apparatus of the invention is applied to a magneto-optical disc recording and/or reproducing apparatus, and in FIGS. 3 to 5, like parts corresponding to those of FIGS. 1A and 1B are marked with the same references and therefore need not be described in detail.

Referring initially to FIG. 3 and FIGS. 4A and 4B, there is shown a magneto-optical disc recording and/or reproducing apparatus 11 which includes an outer casing (i.e., chassis) 12. As shown in FIGS. 4A and 4B, a supporting base 13 is secured to the bottom portion of the outer casing 12. The supporting base 13 has formed at its central portion an opening portion 13a, into which a magneto-optical pickup head apparatus (not shown) is inserted. This magneto-optical pickup head apparatus is translated in the radial direction of the magneto-optical disc D by a head slide apparatus (not shown) and records an information signal on the magneto-optical disc D in cooperation with a bias magnetic field generating device that will be described later.

A cartridge holder 14 is provided within the outer casing 12 as a disc loading device. The cartridge holder 14 is comprised of a top plate 14a, side walls 14b, 14b vertically elongated from left and right side edges of the top plate 14a in the lower direction and supporting edges 14c, 14c inwardly projected from the lower end edges of the two side walls 14b, 14b. Within the cartridge holder 14 a disc cartridge C is inserted, in which the aforementioned optical disc (i.e., magneto-optical disc) D having the disc hubs 1 at the center thereof is rotatably accommodated. U.S. Pat. No. 4,797,770, for example, describes the details of the disc cartridge.

The cartridge holder 14 is supported by the supporting base 13 such that it can be translated in the upper and/or lower direction by a pre-determined elevating mechanism (not shown). Under the condition that the cartridge holder 14 is placed at the upper limit position of the translatable stroke, the disc cartridge C is loaded to and/or unloaded (i.e., ejected) from the cartridge holder 14 at its front side (i.e., the left-hand side of the drawings). When the disc cartridge C is loaded by the cartridge holder 14, the elevating mechanism (not shown) is actuated to translate the cartridge holder 14 to the lower limit position of the translatable stroke, whereby the disc cartridge C is loaded to the pre-determined loading position, i.e., the optical disc D is to be clamped to the clamping device 3 provided on the supporting base 13.

The clamping device 3 is comprised of the turntable 5 attached to the spindle shaft 4 of a drive motor M secured to the supporting base 13 and the magnet 6 secured to the bottom portion of the turntable 5, as already stated. When the cartridge holder 14 is translated in the lower direction, the disc hub 1 of the optical disc D thus loaded is magnetically attracted by the magnet 6 and the center aperture 2 of the disc D is engaged with the top portion of the spindle shaft 4, whereby the disc D is clamped on the clamping device 3.

Though not shown, the disc cartridge C has formed through its upper and lower surfaces openings which are closed by a shutter in the normal condition. Under the condition that the disc cartridge C is inserted into the cartridge holder 14, the shutter is moved by a shutter opening and/or closing mechanism provided in the cartridge holder 14, resulting in the opening being opened. Through this opening, the above-described turntable 5, a bias magnetic field generating device or pushing pins, which will be described later, are inserted into the disc cartridge C, in which they are opposed to the optical disc D.

Above the cartridge holder 14, a bias magnetic field generating device supporting mechanism is provided to support the bias magnetic field generating device which applies an external magnetic field to the record surface of the optical disc D when a signal is recorded on the optical disc D by the magneto-optical disc recording and/or reproducing apparatus.

The bias magnetic field generating device supporting mechanism is constructed as follows.

As shown in FIG. 3 and FIGS. 4A and 4B, there is provided a rotating plate 15 which is comprised of a base portion 15a and a pair of side arm portions 15b, 15b projected forward from left and right side ends of the base portion 15a and is shaped substantially as a U-letter when seen from the top thereof. This rotating plate 15 is pivotally provided on a supporting bracket 16 secured to the rear wall upper edge of the outer casing 12 at the rear end portion of the base portion 15a so that it can rotate in the upper and lower direction. From the central lower edge portion of each of the side arm portions 15b, 15b of the rotating plate 15, a contact member 17 is projected, which abuts against the top plate 14a of the cartridge holder 14.

To the top end portions of the two side arm portions 15b, 15b of the rotating plate 15, a supporting member 18 with a square shape is supported at coupling portions 19, 19 projected from the central portions of the side arm portions 15b, 15b so that the supporting member 18 can rotate in the upper and lower direction. On the lower surface side of the supporting member 18, a bias magnetic field generating device 20 is secured to oppose the record surface of the disc D. The bias magnetic field generating device 20 has incorporated therein a magnetic coil or the like to apply a bias magnetic field to the record surface of the optical disc D to record a signal on the record surface.

The supporting member 18 has formed at its rear portion a supporting leg portion 21 protrusively elongated in the downward direction. The supporting leg portion 21 has formed on its lower end face an engaging recess 21a, and the supporting base 13 has formed on its upper surface a protruded positioning pin 22 which corresponds with the engaging recess 21a.

Further, an opening 23 is formed through the top plate 14a of the cartridge holder 14 in association with the supporting member 18, and the bias magnetic field generating device 20 is opposed to the disc D through this opening 23.

The supporting member 18 is spring-biased by two wire spring members mounted on the rotating plate 15 so that it may translate in the upper and/or lower direction together with the cartridge holder 14.

More specifically, as shown in FIG. 3 and FIGS. 4A and 4B, a first spring 24 is provided to be shaped substantially as a U-letter and is secured at its central portion to the rotating plate 15. Two end portions 24a, 24a of the first spring 24 are in engagement with the upper surfaces of the coupling portions 19, 19 of the supporting member 18, whereby the supporting member 18 is spring-biased downwards by the first spring 24 so that it is kept coupled to the two side arm portions 15b, 15b of the rotating plate 15.

There is provided a second spring 25 which is shaped substantially as a bent C-letter. The central portion of the second spring 25 is secured to the rotating plate 15, and two end portions 25a, 25a of the second spring 25 are projected to the left and right sides of the rotating plate 15. The tip end portions of the two end portions 25a and 25a of the second spring 25 are respectively in engagement with engaging members 26, 26 implanted on the top plate 14a of the cartridge holder 14. Thus, the rotating member 15 is always biased in the lower direction, i.e., in the direction in which the contact member 17 comes in contact with the top plate 14a of the cartridge holder 14.

In accordance with the thus constructed bias magnetic field generating device supporting mechanism, the rotating plate 15 rotates following the slide movement of the cartridge holder 14 in the upper and/or lower direction. Further, in accordance with this movement, the supporting member 18, namely, the bias magnetic field generating device 20 is translated in the upper and/or lower direction.

The aforementioned arrangements are similar to those of a magneto-optical disc recording and/or reproducing apparatus previously proposed by the same assignee of the present application (see Japanese Utility Model Laid-Open Gazette No. 1-42525), now being put into actual practice. In this embodiment, in addition to the above-described mechanisms, a pushing device is additionally provided to help the clamping operation during the loading operation of the optical disc D, which will be described in more detail below.

Referring to FIG. 3 and FIGS. 4A and 4B, a flat elongated portion 27 with a triangular-shape is projected from the front end portion of the supporting member 18 for supporting the bias magnetic field generating device 20 in an opposing relation to the upper surface of the turntable 5. The elongated portion 27 has formed on its lower surface side pushing pins 28 which are used to push the disc hub 1 of the optical disc D. Three pushing pins 28 are provided, in which one pushing pin 28 is located ahead of the spindle shaft 4 so as to oppose the portion near the outer periphery of the disc hub 1 and two pushing pins 28 are provided behind the spindle shaft 4 at left and right sides thereof. In association with the three pushing pins 28, three through-holes 29 are formed through the top plate 14a of the cartridge holder 14.

As will be described later, during the loading operation of the optical disc D, these pushing pins 28 are opposed to the disc hub 1 formed at the central portion of the optical disc D via the through-holes 29 in accordance with the slide movement of the supporting member 18 in the lower direction. Accordingly, the pushing pins 28 push the disc hub 1 in the direction in which the center aperture 2 of the optical disc D is engaged with the spindle shaft 4, thereby helping the clamping operation of the optical disc D. The length of each of these pushing pins 28 is selected so that these pins 28 are released from the disc hub 1 when the center aperture 2 becomes engaged with the peripheral surface of the spindle shaft 4 during the clamping operation of the optical disc D.

On the lower surface side of the elongated portion 27 of the supporting member 18, a supporting protrusion 30 is formed at the pre-determined position to come in contact with the top plate 14a of the cartridge holder 14 to support the front end portion of the supporting member 18 when the supporting member 18 is translated in the lower direction.

An operation of the disc loading apparatus of this embodiment will be described next.

When the cartridge holder 14 is placed at the upper limit position of the slide stroke thereof, i.e., the position at which the disc cartridge C is loaded on and/or ejected from the cartridge holder 14, as shown in FIG. 4A, the rotating plate 15 is kept substantially on the horizontal plane, whereby the supporting member 18, i.e., the bias magnetic field generating device 20 is isolated upward from the top plate 14a of the cartridge holder 14, and the pushing pins 28 are also isolated upwards from the top plate 14a of the cartridge holder 14.

As shown in FIG. 4B, when the cartridge holder 14 is translated downwards to the lower limit position of the slide stroke thereof and the loading operation of the optical disc D is performed, the contact members 17 of the rotating plate 15, which are in contact with the top plate 14a of the cartridge holder 14, are translated in the lower direction accordingly, resulting in the front end portion of the rotating plate 15 being rotated in the lower direction. When the rotating plate 15 is rotated in the lower direction as described above, the supporting member 18, supported near the rotating end side rather than the contact member 17, is translated in the lower direction by the stroke larger than the lowering stroke of the contact member 17. In other words, the supporting member 18 is translated in the lower direction by a stroke larger than the downward direction slide stroke of the cartridge holder 14, whereby the supporting protrusion 30 of the front end portion of the supporitng member 18 is brought in contact with the top plate 14a of the cartridge holder 14. Simultaneously, the engaging recess 21a formed at the rear portion of the supporting leg portion 21 is engaged with the positioning pin 22 and the supporting plate 8 is thereby positioned. Therefore, the bias magnetic field generating device 20 enters the disc cartridge C from the opening portion 23 of the top plate 14a of the cartridge holder 14 so as to oppose the record surface of the optical disc D.

When the cartridge holder 14 is translated in the lower direction, i.e., when the supporting member 18 is translated in the lower direction in accordance with the loading operation of the disc D, the pushing pins 28 are bodily lowered with the supporting member 18 and enter the disc cartridge C through the through-holes 29 thereby to help the clamping operation of the optical disc D.

Figure 5A:
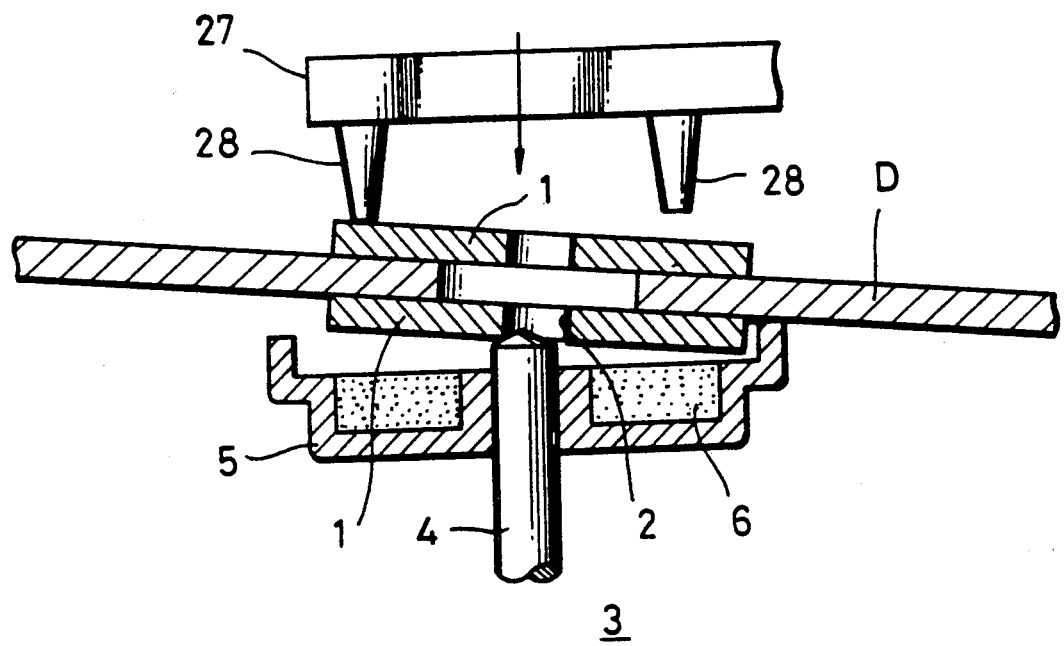
FIGS. 5A and 5B are side views used to explain the disc clamping operation of the disc loading apparatus according to the present invention, respectively.
Figure 5B:
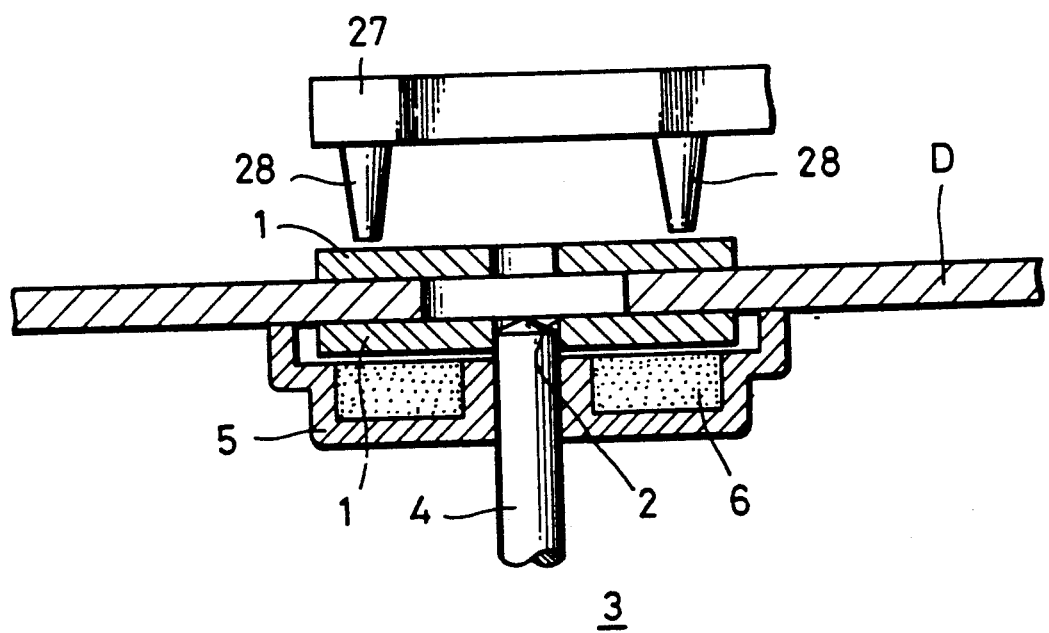

More precisely, as shown in FIG. 5A, when the center aperture 2 in the disc hubs 1 of the disc D loaded onto the clamping device 3 does not accurately correspond with the spindle shaft 4 so that a mis-clamping state is brought about, the pushing pins 28 thus lowered come in contact with the disc hub 1 provided at the central portion of the disc D and push the same in the lower direction. Accordingly, by this pushing force, the central aperture 2 of the disc hubs 1 is guided along the tapered surface of the top of the spindle shaft 4 so as to accurately correspond with the spindle shaft 4. Thereafter, the disc hub 1 is magnetically attracted by the magnetic force of the magnet 6, whereby the disc D is positively clamped onto the turntable 5 as shown in FIG. 5B.

In this disc clamping state, the pushing pins 28 correspond with the disc hub 1 with a pre-determined clearance, thus the disc D can be rotated satisfactorily.

In the disc loading apparatus of this embodiment, the three pushing pins 28 are implanted on the lower surface of the triangular elongated portion 27 at three different positions so that, regardless of the situation of the optical disc D, the disc hub 1 is pushed by any of the pushing pins 28, whereby the central aperture 2 accurately corresponds with the spindle shaft 4. Thus, when the disc loading apparatus is operated under, for example, the condition that it is positioned in the vertical direction, the disc clamping can be performed positively.

As set forth above, according to the disc loading apparatus of the present invention, since during the loading operation of the disc D the pushing pins 28 push the disc hub 1 provided at the central portion of the disc D thereby to help the clamping operation of the disc D on the clamping device 3, the mis-clamping of the disc D can be prevented substantially perfectly. Accordingly, it becomes possible to avoid the substantial possibility of the prior art that the optical disc D rotates in the mis-clamped condition to damage the center aperture 2 or the spindle shaft 4 so that the central aperture 2 or the spindle shaft 4 can not be used. Therefore, it is possible to protect the optical disc D in which important data are recorded. Also, it is possible to prolong the life span of the disc loading apparatus.

The disc loading apparatus of this embodiment is constructed such that the clamping of the optical disc is assisted by utilizing the upper and/or lower movement of the supporting member 18 which supports the bias magnetic field generating device 20. This arrangement can be realized by very slightly modifying the shape of one of the assembly parts forming a part of a magneto-optical disc apparatus now available and by adding some assembly parts. Therefore, it is possible to realize the inexpensive mechanism, which is high in reliability.

While the embodiment of the present invention is described as above, the present invention is not limited to that precise embodiment of the invention. For example, the location of the pushing pins, the number of the pushing pins and the like can be modified properly in response to the driving conditions. Further, the arrangements of the respective portions can be modified in various versions. For example, the double-sided optical disc D as shown in the figures is constructed by bonding two discs each having formed at the central portion the disc hub and the disc hub opposing the bias magnetic field generating device is pushed by the pushing pins. If the optical disc D is a single-sided disc, that is, if the optical disc D is a disc in which a disc hub is provided on one surface, the center portion of a disc surface opposing to the bias magnetic field generating device 20 is pushed and the length of the pushing pins is selected properly in accordance therewith.

The present invention is not limited to the magneto-optical disc recording and/or reproducing apparatus and can be applied to a wide variety of magnetic clamping system disc apparatus.

As set out above, according to this invention, since the disc loading apparatus is provided with the pushing devices for pushing the central portion of the disc, during the disc loading, so that the central aperture of the disc is engaged with the spindle shaft of the clamping device, the central aperture of the disc is positively engaged with the spindle shaft, thereby avoiding the mis-clamping. Therefore, it is possible to avoid such a possibility of the prior art that, in the mis-clamping state, the disc rotates to damage the center aperture of the disc or the spindle shaft of the clamping device. Thus, the disc can be protected from being damaged and the life span of the apparatus can be prolonged.

Having described a preferred embodiment of the invention with reference to the attached drawings, it is to be understood that the invention is not limited to that precise embodiment of the invention and that various changes and modifications could be effected by one skilled in the art without departing from the spirit or scope of the invention as defined in the appended claims.

I claim:

1. A disc loading mechanism for a disc having a hub with a central spindle hole and formed of magnetizable metal attached to a central portion of the disc, the mechanism comprising:

disc rotating means having a spindle shaft and clamping means for clamping the disc hub by a magnetic attracting force;

loading means for loading said disc on said disc rotating means; and pushing means for contacting and pushing the hub during said loading, so that when said disc is loaded on said disc rotating means by said loading means, the central spindle hole of said disc hub is engaged with the spindle shaft of said disc rotating means, said pushing means comprising at least one pin having a length such that when said disc hub is engaged with the spindle shaft said at least one pin is out of contact with said hub.

2. The disc loading mechanism as claimed in claim 1, wherein said pushing means includes means for urging the hub of said disc as said loading means is translated downwards to a disc clamping position.

3. The disc loading mechanism as claimed in claim 2, wherein said loading means is arranged to freely move between a first position higher than said disc rotating means and a clamping position of said disc clamping means lower than said first position.

4. The disc loading mechanism as claimed in claim 2, wherein said pushing means is comprised of an arm member rotatable in accordance with the downward translation of the disc loading means and said at last one pin is provided at the tip end of said arm member so as to project downwardly from said arm member.

5. A disc loading mechanism for a magneto-optical disc recording and/or reproducing apparatus including a bias magnetic field generating device for recording and/or reproducing a magneto-optical disc rotatably incorporated within a disc cartridge and in which a disc hub formed of a magnetizable metal plate is attached to the central portion of the disc and has a central aperture formed therein, said mechanism comprises:

- means for clamping said disc hub by a magnetic attracting force and for rotating said disc on a spindle shaft;
- loading means for loading a disc cartridge inserted into said means for clamping and for rotating;
- supporting means for supporting said bias magnetic field generating device so that said bias magnetic field generating device can be freely moved up and down to positions remote from and/or close to said magneto-optical disc which is clamped by said means for clamping and for rotating in a loading operation of said disc by said loading means; and
- pushing means formed as a plurality of downwardly depending pins for contacting and pushing the disc hub of said magneto-optical disc, so that when said magneto-optical disc is loaded on said means for clamping and for rotating by said loading means the center aperture of said disc hub is engaged with said spindle shaft of said means for clamping and rotating, and wherein said plurality of pins have a length such that when said disc is engaged with the spindle shaft said plurality of pins are out of contact with said disc hub.

6. The mechanism as claimed in claim 5, wherein said pushing means is provided on said supporting means.

7. The mechanism as claimed in claim 5, wherein said pushing means is provided on said supporting means at a position opposing said means for clamping and for rotating.

8. The mechanism as claimed in claim 7, wherein said loading means includes a cartridge holder for holding the disc cartridge and said pushing means is projected from an opening portion formed through said cartridge holder when said cartridge holder is in a position in which said magneto-optical disc in said disc cartridge is clamped by said means for clamping and rotating.

9. The mechanism as claimed in claim 8, wherein said supporting means is comprised of an arm member rotatable for moving said cartridge holder up and down and a supporting member for supporting said bias magnetic field generating device rotatably attached to said arm member.

10. The mechanism as claimed in claim 9, wherein said pushing means is mechanically attached to said supporting member.

* * * * *